(12) United States Patent
Ambros

(10) Patent No.: US 6,308,664 B1
(45) Date of Patent: Oct. 30, 2001

(54) PROCESS AND ARRANGEMENT FOR CONTROLLING THE TEMPERATURE OF A MEDIUM

(75) Inventor: Peter Ambros, Kornwestheim (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/075,526

(22) Filed: May 11, 1998

(30) Foreign Application Priority Data

May 10, 1997 (DE) .............................. 197 19 792

(51) Int. Cl.[7] ...................................................... F01P 7/02
(52) U.S. Cl. ................... 123/41.12; 123/41.05; 123/41.1; 123/41.44
(58) Field of Search ................. 123/41.1, 41.05, 123/41.08, 41.12, 41.02, 41.44; 236/35, 78 D

(56) References Cited

U.S. PATENT DOCUMENTS

| | | | |
|---|---|---|---|
| 4,779,577 | 10/1988 | Ritter et al. | 123/41.05 |
| 5,058,388 | * 10/1991 | Shaw et al. | 62/93 |
| 5,529,025 | * 6/1996 | Ranzinger et al. | 123/41.1 |
| 5,617,816 | * 4/1997 | Saur et al. | 123/41.08 |
| 5,619,957 | * 4/1997 | Michels | 123/41.44 |
| 5,651,264 | * 7/1997 | Lo et al. | 62/230 |

FOREIGN PATENT DOCUMENTS

| | | |
|---|---|---|
| 217 274 | 1/1985 | (DE) . |
| 217 275 | 1/1985 | (DE) . |
| 34 39 438 | 5/1985 | (DE) . |
| 34 35 700 | 4/1986 | (DE) . |
| 37 02 947 | 8/1988 | (DE) . |
| 38 10 174 | 10/1989 | (DE) . |
| 41 04 093 | 8/1992 | (DE) . |
| 195 08 102 | 3/1995 | (DE) . |
| 0 084 378 | 7/1983 | (EP) . |
| 58-106123 | 6/1983 | (JP) . |
| 62-288309 | 12/1987 | (JP) . |

OTHER PUBLICATIONS

P. Ambros and U. Essers, "Simulation Program for Design and Optimization of Engine Cooling Systems for Motor Cars", ISATA Conference, Sep. 13, 1993 to Sep. 17, 1993, pp. 647–655.

Siegfried Baumgarth, Wolfenbuettel, "Regelungsstrategien fuer Einzelraumregelung", Automatisierungstechnische Praxis 37, 1995, pp. 29–35.

* cited by examiner

Primary Examiner—Noah P. Kamen
(74) Attorney, Agent, or Firm—Crowell & Moring, LLP

(57) ABSTRACT

An arrangement and a process for controlling the temperature of a medium, particularly of the cooling water temperature of a motor vehicle engine. At least two energy-consuming units influence the temperature to be controlled, of which at least one can be controlled with respect to its output. A control unit adjusts the output of these units for causing a required influencing of the temperature. The output of each temperature-influencing unit is adjusted by means of a previously determined, energy-minimal characteristic diagram $K_E$ which indicates for each system condition the operating point of the absolutely minimal energy consumption of the energy-consuming units for controlling the temperature according to a respective desired value.

12 Claims, 2 Drawing Sheets

PROCESS AND ARRANGEMENT FOR CONTROLLING THE TEMPERATURE OF A MEDIUM

This application claims the priority of 197 19 792.2, filed May 10, 1997, the disclosure of which is expressly incorporated by reference herein.

BACKGROUND AND SUMMARY OF THE INVENTION

The invention relates to a process and an arrangement for controlling the temperature of any solid, liquid or gaseous medium. In the case of processes and arrangements of this type, the temperature to be controlled is influenced in an appropriate manner by at least two energy-consuming units, such as the cooling fans, the circulation pumps of a cooling or heating circulation system, chillers, etc. such that the temperature is controlled in the respective desired manner; for example, is adjusted to the desired value. The medium whose temperature is to be controlled may, in particular, be a liquid/gaseous coolant or refrigerant of a cooling or air-conditioning system or a heating fluid of a heating circulation system, but also any component whose temperature is to be maintained at a certain value or within a certain range. A contemplated field of application is the control of the cooling water temperature of a water-cooled motor vehicle engine or the control of the temperature of the engine itself; that is, of the engine block, or of critical points in the engine, for example, the temperature of the valve web.

A process and an arrangement of this type for controlling the coolant temperature of an internal-combustion engine, particularly of an internal-combustion of a motor vehicle, are described in German Patent Document DE 195 08 102 C1, in the case of which at least one coolant pump and a cooling fan are used as energy-absorbing, temperature-influencing units. A control unit controls the coolant temperature to a predeterminable desired value by a corresponding adjustment of the rotational speed of the pump and the fan. In this case, the control unit compares the time-related efficiencies caused, on the one hand, by the operation of the coolant pump and, on the other hand, by those of the fan, for the heat transmission between the fan air flow and the coolant on a cooler module. For this purpose, a gradient method is used in that the heat transfer coefficient for the cooler module is determined, and the partial derivations of the coefficient are, on the one hand, formed according to the coolant flow generated by the pump and, on the other hand, according to the air flow generated by the fan and are used as a measurement for the respective time-related efficiency. These time-related efficiencies are analyzed in that, in the respective operating position, on the basis of the momentary operation point of the coolant circulation system, a step-by-step search takes place for a possibly more favorable operating point in that the quotients of the time-related efficiency to the power consumption for the fan and the pump are compared and, according to which quotient is larger, the air flow or coolant flow is increased. It is known that gradient methods of this type do not ensure that the absolutely most favorable operating point is reached since also an only locally most favorable operating point represents a stable point for this method.

In the case of systems with two power-consuming components by means of which a certain physical quantity can be influenced, it is known to determine in the pertaining output diagram characteristic curves of a respective constant value of the physical quantity and to determine, for the respective momentary value of the physical quantity, by a tangent formation, the pertaining point of the minimal overall power expenditure for the two components. In the conference contribution by P. Ambros and U. Essers, "Simulation Program for Design and Optimization of Engine Cooling Systems for Motor Car", ISATA Conference, Sep. 13, 1993 to Sep. 17, 1993, Aachen, this was described with respect to a coolant circulation system of a motor vehicle engine in that, for a given coolant temperature, the minimal sum of the power consumption of cooling air fan is found, on the one hand, and that of a cooling water pump is found, on the other hand. For this purpose, the characteristic curves of the constant coolant temperature are determined in the two-dimensional output diagram and then the point of the minimal overall output for the given coolant temperature is determined by means of the tangent formation with the straight line of the constant overall output as the tangent. In this case, each characteristic curve of the constant coolant temperature may vary as the function of the system condition, that is, of vehicle condition parameters, such as the outside temperature, the vehicle speed, the engine load, etc.

An object of the invention is to provide a process and an arrangement of the initially mentioned type by means of which and by means of relatively low real-time computing expenditures in each operating condition of the system the medium temperature can be reliably controlled with the lowest possible energy consumption and particularly can be maintained at a defined desired value in a controlled or regulated manner.

This and other objects have been achieved according to the present invention by providing a process for controlling the temperature of a medium, the temperature of the medium to be controlled being influenceable by at least two energy-consuming units, at least one of the energy-consuming units having a controllable output, wherein the output of each of the energy-consuming units is adjusted according to a previously determined energy-minimal characteristic diagram which indicates for each system condition the operating point of an absolutely minimal overall energy consumption of the units for controlling the temperature according to a respective desired temperature value.

This and other objects have been achieved according to the present invention by providing an arrangement for controlling the temperature of a medium, comprising: at least two energy-consuming units for influencing the temperature of the medium to be controlled, at least one of the energy-consuming units having a controllable output, and a control unit which adjusts the output of each of the energy-consuming units according to a previously determined, energy-minimal characteristic diagram which indicates for each system condition the operating point of the absolutely minimal overall energy consumption of the units for controlling the temperature according to a respective desired temperature value.

According to the invention, the output of each of the energy-consuming units provided for influencing the temperature to be regulated is adjusted according to a previously determined, characteristic energy-minimal diagram which indicates for each system condition, including a respective desired value of the temperature to be regulated, the operating point of the absolute minimal overall energy consumption of the energy-consuming units. As the result of this predetermined characteristic diagram, the control unit which carries out the temperature control, after the momentary system condition is sensed, is immediately provided with the information concerning the operating point for the energy-consuming units which is energy-minimal in this condition, which is always an absolute energy minimum. This permits a comparatively fast reaction of the temperature control to changes of the system condition. Because of this global energy minimizing method, it is ensured that the adjusted operating point corresponds not only to a local energy minimum but to the absolute energy minimum in the corresponding system condition.

According to further advantageous developments of the present invention, a checking of the previously determined energy-minimal characteristic diagram is provided at defined time intervals in that, for at least one reference system condition, an energy minimum determination is carried out according to the above-mentioned conventional tangent method in the case of which, after the detection of the momentary system condition, the isothermal line pertaining to the desired value of the temperature to be regulated is determined in the power or energy consumption diagram of the energy-consuming units and then the pertaining tangent or tangent plane of the constant minimal overall energy consumption is determined. This determined energy-consumption minimum is compared with the energy consumption minimum filed in the characteristic diagram for the corresponding reference system condition, whereupon the characteristic diagram can be appropriately corrected depending on the result of the comparison.

According to certain preferred embodiments, the present invention is used for controlling the coolant temperature of a cooling circulation system, for example, for a motor vehicle engine, and contains one or several energy-consuming units which influence the coolant temperature and which have the form of an output-controllable coolant circulation pump and/or of an output-controllable fan whose cooling air flow can act on a cooler of the cooling circulation system. By way of the control unit, the pump and/or the fan are operated such that, on the one hand, the coolant temperature is controlled in the desired manner and, on the other hand, the overall energy consumption of the temperature-influencing units is minimal.

According to certain preferred embodiments, the present invention is used for controlling the coolant temperature of a cooling circulation system provided in a motor vehicle, for example, for cooling an internal-combustion engine, and contains, as one of the power-consuming units, a shutter by means of which the throughput of a ram pressure cooling air flow for a cooler of the cooling circulation system can be variably adjusted with a driving-power-influencing effect on the aerodynamic drag of the vehicle. In this case, the power consumption related to the shutter does not primarily result from the energy expenditure operating the latter but from the fact that, depending on how much air is withdrawn as a cooling air flow for the cooler from the ram pressure range which forms increasingly at a higher vehicle speed, the aerodynamic drag and thus the energy expenditure required for the moving of the vehicle will fluctuate. The use of the shutter therefore allows a controlling of the coolant temperature which is optimized with respect to a minimal overall energy consumption also in the range of higher driving speeds in which the cooling air flow against the cooler can be caused by the ram pressure without the requirement of activating a fan for this purpose.

Other objects, advantages and novel features of the present invention will become apparent from the following detailed description of the invention when considered in conjunction with the accompanying drawings.

DETAILED DESCRIPTION OF THE DRAWINGS

Figure 1:
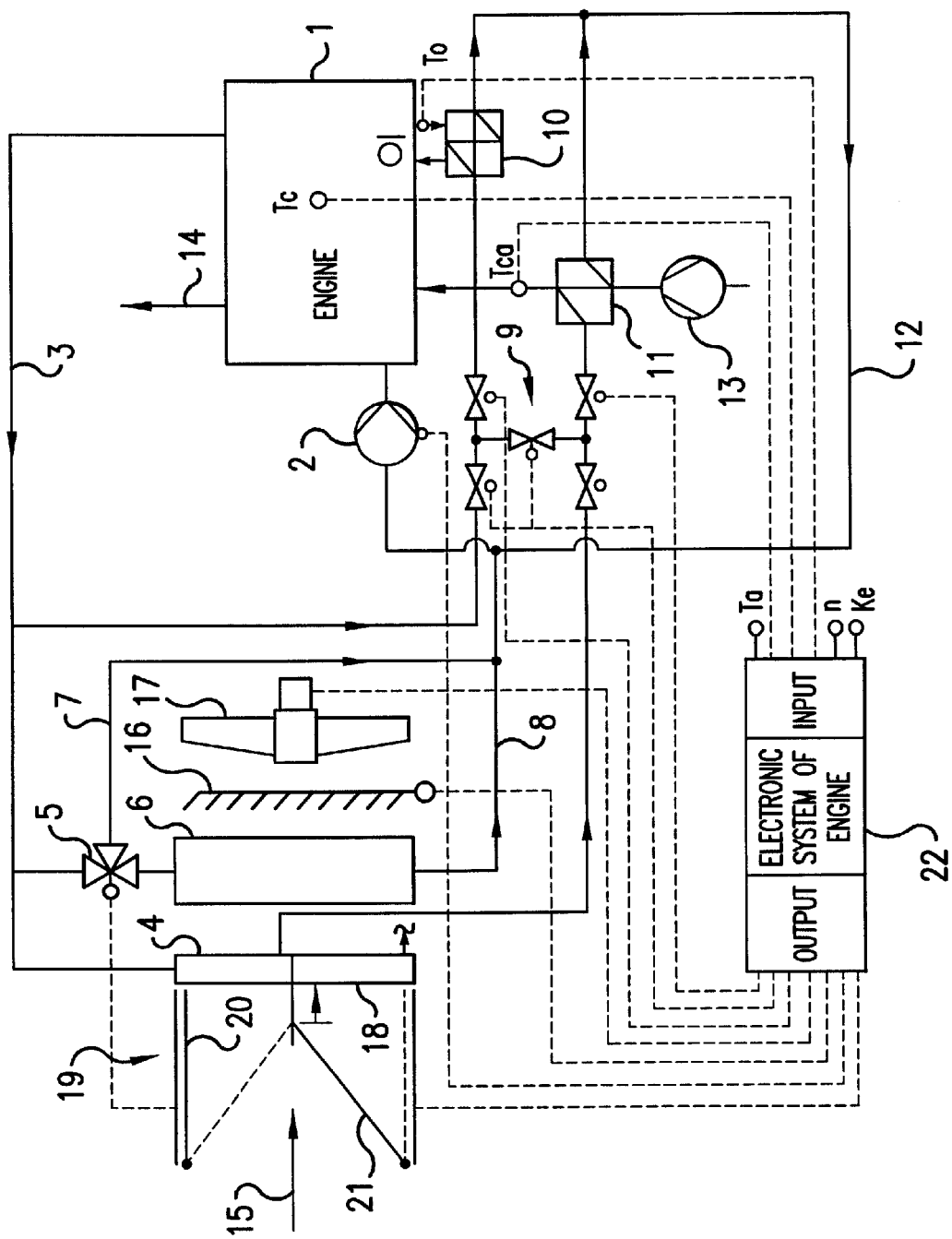
FIG. 1 is a schematic diagram of a coolant circulation system for cooling a motor vehicle engine which comprises an arrangement for controlling the coolant temperature, according to a preferred embodiment of the present invention.

FIG. 1 illustrates a coolant circulation system for the cooling of a motor vehicle internal-combustion engine 1 as well as for secondary cooling purposes, such as the charge air cooling. A coolant pump 2, whose output can be controlled, is used for the circulation of the coolant. By way of a branching line section 3, which contains suitable control valves, the coolant emerging from the engine 1 arrives at different cooler units of the cooling circulation system. In this case, a portion of the coolant is guided through a low-temperature coolant cooler 4. According to the position of a pertaining valve 5, another portion of the coolant is guided either through a main coolant cooler 6 or via a bypass line 7 past this main coolant cooler 6. The coolant which leaves the main coolant cooler 6 and the coolant guided by way of the bypass line 7 are returned to the engine 1 by way of the return line 8 in which the cooling water pump 2 is situated.

The coolant emerging from the low-temperature coolant cooler 4 and another portion of the coolant branched off the line section 3 leading away from the engine 1 arrive in a valve complex 9 which consists of five valves and by means of which one and/or the other of these two coolant portions can in a controllable manner be supplied to an oil cooler 10 and/or a charge air cooler 11. Downstream of these two coolers 10, 11, the pertaining coolant flows are combined again and arrive via a line 12 in the return line 8 in front of the coolant pump 2. On the other side, the engine oil to be cooled flows through the oil cooler 10, which engine oil circulates between it and the engine 1. In the charge air cooler 11, the charge air coming from the turbocharger 13 is cooled and is subsequently fed to the engine 1. The engine exhaust gases are discharged by way of an exhaust gas line 14 which is only shown schematically.

As also illustrated in FIG. 1, the low-temperature coolant cooler 4 and the main coolant cooler 6 are part of a cooler block which can be acted upon by a cooling air flow 15 and which comprises as additional components an air-throughput-controlling shutter 16, a fan 17, whose output can be controlled, and a condenser 18 of an air conditioner which is of no further interest here. The condenser 18, together with the low-temperature coolant cooler 4 arranged laterally thereof, forms a cooling unit which is in the front in the air flow direction and which is serially followed by the main coolant cooler 6, the shutter 16 and the output-controllable fan 17. On the upstream side of the front cooling unit, a metering element complex 19 is provided which contains two controllable swivelling flaps 20, 21 by means of which the inflowing cooling air flow 15 can be distributed to the area of the low-temperature coolant cooler 4 and that of the condenser 18. In the position of the flaps 20, 21 which is shown in FIG. 1, only the low-temperature coolant cooler 4 is acted upon by the inflowing air flow 15, while in the flap position indicated by a broken line, only the condenser 18 is acted upon by the cooling air flow 15. Since the metering element complex 19 is used only for distributing the air flow 15 to the low-temperature coolant cooler 4, on the one hand, and the condenser 18, on the other hand, the flaps 20, 21 are controlled between these two end positions in each case into such intermediate positions which leave the overall air throughput unchanged so that the air flow throughput at the main coolant cooler 6 remains unaffected by the metering element complex 19. On the contrary, when the vehicle is stopped or at low driving speeds, this overall air throughput is controlled by way of the output-controllable fan 17 and, at higher driving speeds, at which a sufficient ram pressure exists in front of the metering element complex 19, is controlled by way of the adjustable shutter 16.

For controlling or regulating the coolant circulation system and the cooling air, a control unit 22 is used which is simultaneously applied as an engine timing unit for the vehicle engine 1. On the input side, the required measuring information is fed to the control unit, particularly the rotational engine speed n, the fuel injection Ke and diverse temperature information, such as the ambient temperature $T_a$, the coolant temperature $T_C$, the charge air temperature $T_{CA}$ and the engine oil temperature $T_O$ which are sensed by way of respective temperature sensors which are positioned at the appropriate point. The pertaining measuring signal lines are indicated in FIG. 1 by a broken line, as are the control lines which originate on the output side of the control unit 22 and by way of which the control unit 22 controls the various controllable components of the system in a manner which will be explained in detail in the following to the extent that it is of interest in this case and which is otherwise known to a person skilled in the art.

Characteristically, in a normal operating mode, with the exception of brief extreme situations, the control of the coolant circulation system takes place under energy-consumption-minimizing aspects; that is, the various energy-consuming components of the cooling water circulation system are controlled by the control-unit 22 such that the coolant temperature $T_K$ or, in other words, the temperature gradient $TG=T_C-T_a$ between the coolant temperature $T_C$ and the outside temperature $T_a$ is controlled by means of the overall energy consumption which is minimally possible in the respective vehicle operating situation to a predetermined desired value. For finding this operating point which is most favorable with respect to the energy, a process takes place which will be explained in the following with reference to FIG. 2.

For this purpose, data is recorded beforehand for the particular vehicle or the particular engine cooling system concerning the energy consumption; that is the power consumption of all energy-consuming units of the coolant circulation system in the various operating positions, concerning the resulting coolant temperature gradient TG and concerning the other system condition parameters relevant to the coolant temperature, such as the vehicle speed, the engine load, etc. In particular, the isothermal lines for a respectively predetermined desired value of the coolant temperature gradient TG is determined in the output diagram which comprises all energy-consuming units influencing the coolant temperature. In the case of the arrangement of FIG. 1, these are particularly the output-controllable coolant pump 2 as well as, in the low speed range, the output-controllable fan 17 and, in the high speed range, the shutter 16. For the present consideration, the shutter 16 therefore represents an energy-consuming component of the system, because its position determines the throughput of the cooling air flow 15 which is branched off the ram pressure which, at higher driving speeds, forms in front of the inlet side of the metering element complex 19. However, the removal of this cooling air flow from this ram air affects the aerodynamic drag of the vehicle in the concerned driving situation and thus the driving performance. The more the shutter 16 is opened, the more the driving performance is reduced which increases the overall energy consumption correspondingly.

Figure 2:
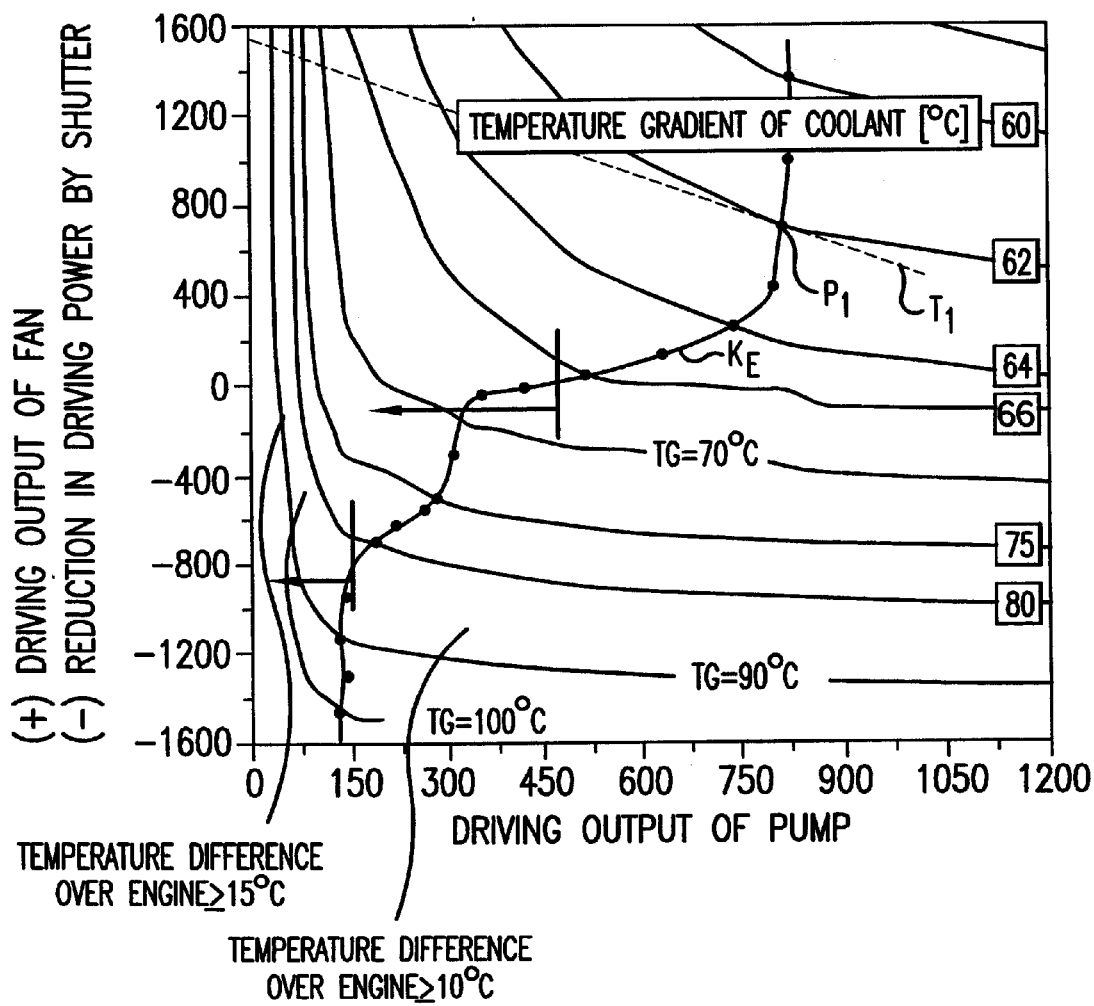
FIG. 2 is an output diagram for a coolant pump, a fan and a shutter of the system of FIG. 1 which is used in a control unit of the system of FIG. 1 and has an energy-minimal characteristic operating point diagram.

FIG. 2 shows the output diagram which takes these energy-consuming units into account, in which case the driving output of the cooling pump 2 is entered on the abscissa and the driving output of the fan 17 is entered on the ordinate on the one hand with positive preceding signs and, on the other hand, the driving performance reduction caused by the shutter is entered on the ordinate with a negative preceding sign. In the case of the output demand of the pump 2 and the fan 17, the efficiency is taken into account which is obtained for the power transmission path between the engine output shaft and the pumps or the fan wheel. As examples, the isothermal lines for the selected desired values of the coolant temperature gradient TG in the case of fixed remaining system condition parameters are listed in the output diagram. Each isothermal line therefore indicates the curve for the outputs of the coolant pump 2 and the fan 17 or the shutter 16 to be adjusted which are possible for achieving a desired temperature gradient value in the case of the given system condition, and varies as a function of additional system condition parameters, such as the vehicle speed, the engine load and the position of the metering element complex 19. The latter takes place because the metering elements, that is, the flaps 20, 21 of this complex 19 determine by their position how large the proportion of the inflow air 15 is which is fed to the low-temperature coolant cooler 4 and therefore contributes to the cooling of the coolant, while the airflow proportion fed to the condenser 18 does not influence the engine cooling water temperature and therefore generally has a different influence on the whole energy consumption in the vehicle. As required, the metering element complex 19 can be included in the energy consideration as an indirectly energy-consuming unit.

For each of the determined isothermal lines of the coolant temperature gradient TG, within the previous initialization of the control unit 22, the pertaining operating point of the minimal overall energy consumption for the coolant-temperature-influencing units, that is, the coolant pump 2 and the fan 17 and the shutter 16, is determined according to the above-mentioned tangent process, in which case it is utilized that the lines of the constant overall energy consumption in the output diagram of FIG. 2 are straight lines with a certain slope. As an example, the tangent $T_1$ which occurs for the desired temperature gradient value of 62° C. is indicated by a broken line in FIG. 2. The pertaining tangent point $P_1$ forms the operating point $P_1$ which is optimal with respect to the energy for the given system condition, in that it represents the absolute energy minimum for the sum of the energy consumption of all coolant-temperature-influencing units for achieving the desired temperature gradient value. After the carrying-out of this determination of the respective absolute energy minimum for the various temperature gradient isothermal lines of a system condition, the energy-minimal characteristic curve $K_E$ is obtained which is drawn by a thick line in FIG. 2, in which case it relates in its upper half with the positive ordinate values to the operation of the fan 17 and, in its lower half, with the negative ordinate values to the operation of the shutter 16. In a supplementary manner, FIG. 2 indicates for informational purposes the limits at which the temperature difference over the engine exceeds the thresholds of 10° C. and 15° C.

In the described manner, the pertaining energy-minimal characteristic output curve $K_E$ for the energy-consuming units is determined beforehand for each possible normal system operating condition for influencing the coolant temperature and the totality of these characteristic curves is then stored in the control unit 22 as a directly retrievable characteristic diagram. In the subsequent system operation, the control unit 22 will then continuously by means of the measuring quantities supplied to it query the respective system condition. Subsequently, because of the filed energy-minimal characteristic output diagram, it will immediately be capable of controlling the coolant temperature $T_C$ or analogously the coolant temperature gradient TG to a desired value such that in this case the overall energy consumption for the energy-consuming coolant circulation system units, that is, particularly the coolant pump 2 and the fan 17 or the shutter 16, remains minimal. For this purpose, the control unit 22 must carry out no high-expenditure real-time optimization calculations but must only file the operating point pertaining to the detected system condition in the energy-minimal characteristic diagram. As a result, it can comparatively rapidly react to condition changes. Since the energy-minimal characteristic diagram was obtained by the described global energy minimum determination process, it is ensured that the operating point which is in each case selected by the control unit represents not only a local but always an absolute minimum for the overall energy consumption of the units included in the cooling temperature control. The desired value may be defined in a fixed manner but advantageously may be defined in a variable manner as a function of the operation; for example, lower at high loads. In the latter case, the operation-dependent desired values can be filed as a characteristic diagram.

Expediently, it is also provided that from time to time the control unit 22 carries out a checking of the filed energy-minimal characteristic diagram. This can take place, for example, in that at least one reference system condition is indicated at which, during such a checking operation, the control unit 22 newly determines the pertaining desired temperature value isothermal line in the output diagram of the temperature-influencing unit and by a tangent formation the energy-minimal operating point and then compares this operating point with the corresponding operating point previously filed in the characteristic diagram. If a coincidence is determined in this comparison within a defined tolerance, this is recognized by the control unit 22 as a continuously correct characteristic diagram. In contrast, if the control unit determines larger deviations, it carries out a corresponding correction and thus an updating of the filed energy-minimal characteristic diagram.

It is understood that, in certain limit situations, the coolant temperature control can be carried out by the control unit 22 in other operating modes than the described operating mode which is optimal under energy consumption aspects. Such exceptional operating phases will, for example, be expedient when otherwise the air throughput for the condenser 18 or the charge air cooler 11 is no longer sufficient or critical absolute pressures or pressure gradients in the coolant circulation system would be exceeded.

By means of the described approach, it is possible to control the engine coolant temperature in almost all system operating conditions in an energy-optimized manner without the requirement of dimensioning the coolant circulation system excessively large as occurs in the case of conventional circulation systems with an uncontrolled coolant pump and/or an uncontrolled fan as well as a lacking coordination of the rotational pump speed and the rotational fan speed. It is understood that, according to the application, modifications of the described embodiment can be implemented. Thus, optionally the shutter 16 or the fan 17 or the controllability of the pump can be eliminated, or additional energy-consuming units can be provided for influencing the cooling water temperature $T_C$ which are included in the considerations for achieving a minimal overall energy consumption, which results in a correspondingly higher-dimensional output diagram and thus also in acorrespondingly higher-dimensional energy-minimal characteristic diagram. However, in every case, the computing expenditure to be carried out by the control unit 22 in the continuous driving operation remains clearly lower than when a local gradient method is used for finding the most favorable operating point with respect to energy in real time.

It is also clear that the arrangement according to the invention and the process according to the invention are not limited to controlling the coolant temperature of a motor vehicle engine but can beneficially be used wherever any solid, liquid or gaseous medium is to be regulated or controlled by at least two energy-consuming units. A variant of the arrangement of FIG. 1 according to the invention can be used, for example, for controlling the temperature of the engine block itself instead of that of the coolant.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for controlling the temperature of a medium, comprising:
   at least two energy-consuming units for influencing the temperature of the medium to be controlled, each of the at least two energy-consuming units having a controllable output, and
   a control unit which adjusts the output of the at least two energy-consuming units according to a previously determined, energy-minimal characteristic diagram which indicates for each system condition the operating point of the absolutely minimal overall energy consumption of the units for controlling the temperature according to a respective desired temperature value,
   wherein said medium is a coolant in a cooling circulation system of a motor vehicle engine,
   wherein said energy-consuming units comprise an output-controllable cooling circulation pump and an output-controllable fan which directs a cooling air flow on a cooler of the cooling circulation system, and
   wherein said energy-consuming units further comprise a shutter which is variable to adjust a driving-power-influencing ram pressure cooling air flow for a cooler of the cooling circulation system.

2. An arrangement according to claim 1, wherein the output demand of the pump and the fan is calculated depending on an efficiency obtained for a power transmission path between an engine output shaft and pumps or a fan wheel.

3. An arrangement for controlling the temperature of a medium, comprising:
   at least two energy-consuming units for influencing the temperature of the medium to be controlled, each of the at least two energy-consuming units having a controllable output, and
   a control unit which adjusts the output of the at least two energy-consuming units according to a previously determined, energy-minimal characteristic diagram which indicates for each system condition the operating point of the absolutely minimal overall energy consumption of the units for controlling the temperature according to a respective desired temperature value, wherein said medium is a coolant in a cooling circulation system of a motor vehicle engine, and wherein said energy-consuming units comprise a shutter which is variable to adjust a driving-power-influencing ram pressure cooling air flow for a cooler of the cooling circulation system.

4. An arrangement for controlling the temperature of a coolant in a cooling circulation system of an engine, comprising:

at least two energy-consuming units for influencing the temperature of the coolant to be controlled, each of the at least two energy-consuming units having a controllable output, and a control unit which adjusts the output of the at least two energy-consuming units according to a previously determined, energy-minimal characteristic diagram which indicates for each system condition the operating point of the absolutely minimal overall energy consumption of the units for controlling the temperature according to a respective desired temperature value, wherein a threshold limit for a temperature difference over an engine is set, and wherein the at least two energy-consuming units are controlled by means for determining the temperature difference over the engine such that said temperature difference will not exceed said threshold limit.

5. An arrangement according to claim 4, wherein said threshold limit is 10° C.

6. An arrangement according to claim 4, wherein said threshold limit is 15° C.

7. A process for controlling the temperature of a medium, the temperature of the medium to be controlled being influenceable by at least two energy-consuming units, each of the at least two energy-consuming units having a controllable output, comprising:

adjusting each output of the at least two energy-consuming units with a control unit according to a previously determined energy-minimal characteristic diagram which indicates for each system condition the operating point of an absolutely minimal overall energy consumption of the units for controlling the temperature according to a respective desired temperature value, wherein a characteristic-diagram checking is carried out at predeterminable time intervals during which, for at least one reference system condition, an isothermal line is determined for a predetermined desired value of the temperature to be controlled in the output diagram of the at least two energy-consuming units and a pertaining tangent of the minimal overall energy consumption of the units is determined and the resulting overall energy consumption is compared with the pertaining value from the characteristic diagram and the characteristic diagram is updated as a function of the result of the comparison.

8. A process according to claim 7, and further comprising calculating the output demand of the at least two energy-consuming units depending on an efficiency obtained for a power transmission path between an engine output shaft and pumps or a fan wheel.

9. A process according to claim 8, wherein said medium is a coolant in a cooling circulation system of a motor vehicle engine.

10. A process for controlling the temperature of a coolant in a cooling circulation system of an engine, the temperature of the coolant to be controlled being influenceable by at least two energy-consuming units, each of the at least two energy-consuming units having a controllable output, comprising:

adjusting each output of the at least two energy-consuming units with a control unit according to a previously determined energy-minimal characteristic diagram which indicates for each system condition the operating point of an absolutely minimal overall energy consumption of the units for controlling the temperature according to a respective desired temperature value, setting a threshold limit for a temperature difference over the engine, and controlling the at least two energy-consuming units by means for determining the temperature difference over the engine such that said temperature difference will not exceed said threshold limit.

11. A process according to claim 10, wherein said threshold limit is 10° C.

12. A process according to claim 10, wherein said threshold limit is 15° C.

* * * * *